(12) United States Patent
Juen et al.

(10) Patent No.: US 8,777,337 B2
(45) Date of Patent: Jul. 15, 2014

(54) CHAIN DRIVE ASSEMBLY AND WORK MACHINE

(75) Inventors: Peter Juen, St. Anton (AT); Werner Haiden, Ludesch (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 349 days.

(21) Appl. No.: 13/188,394

(22) Filed: Jul. 21, 2011

(65) Prior Publication Data

US 2012/0019056 A1 Jan. 26, 2012

(30) Foreign Application Priority Data

Jul. 22, 2010 (DE) .......................... 10 2010 031 834

(51) Int. Cl.
*B62D 55/30* (2006.01)

(52) U.S. Cl.
CPC ..................................... *B62D 55/30* (2013.01)
USPC ............... 305/145; 305/143; 305/153; 92/18; 92/129; 180/9.1; 474/109; 474/110

(58) Field of Classification Search
CPC ....................................................... B62D 55/30
USPC .......... 305/143, 145, 153, 156; 92/18, 19, 20, 92/129; 180/9.1; 474/100, 109, 110, 111, 474/140
See application file for complete search history.

(56) References Cited

U.S. PATENT DOCUMENTS

| | | | |
|---|---|---|---|
| 2,926,969 A * | 3/1960 | Ashley, Jr. ................... | 180/9.52 |
| 3,008,772 A * | 11/1961 | Helsel, Sr. .................... | 305/146 |
| 3,101,977 A * | 8/1963 | Hyler et al. ................... | 305/145 |
| 3,198,587 A | 8/1965 | Rish | |
| 3,907,382 A | 9/1975 | Kessinger, Jr. | |
| 4,003,608 A * | 1/1977 | Carter .......................... | 305/196 |
| 4,413,862 A | 11/1983 | Ragon | |
| 4,470,583 A * | 9/1984 | Peiffer et al. .............. | 267/64.26 |
| 4,881,786 A * | 11/1989 | Tonsor .......................... | 305/145 |
| 4,963,121 A * | 10/1990 | Himura et al. ................ | 474/111 |
| 4,983,144 A * | 1/1991 | Ojima .......................... | 474/138 |
| 5,035,680 A * | 7/1991 | Ojima .......................... | 474/138 |

(Continued)

FOREIGN PATENT DOCUMENTS

| | | |
|---|---|---|
| DE | 2344875 A1 | 3/1975 |
| DE | 2909346 A1 | 9/1979 |

(Continued)

OTHER PUBLICATIONS

Region—Dictionary definition and pronunciation—Yahoo! Education, available at, http://education.yahoo.com/reference/dictionary/entry/region (last visited Aug. 30, 2013).*

*Primary Examiner* — James English
(74) *Attorney, Agent, or Firm* — Alleman Hall McCoy Russell & Tuttle LLP

(57) ABSTRACT

The present disclosure relates to a chain drive assembly for a work machine, in particular for a crawler-mounted crane or a crawler excavator, having a drive crawler track, at least one displaceably supported sprocket wheel, in particular a guide wheel or idler wheel, and at least one tensioning device to tension the crawler track, wherein at least one abutment is provided which bounds the displacement of the displaceably supported sprocket wheel. The present disclosure further relates to a work machine, in particular to a crawler-mounted crane or a crawler excavator, having such a chain drive assembly.

15 Claims, 2 Drawing Sheets

(56) References Cited

U.S. PATENT DOCUMENTS

| | | | |
|---|---|---|---|
| 5,037,357 A * | 8/1991 | Ojima | 474/111 |
| 5,073,158 A * | 12/1991 | Ojima | 474/138 |
| 5,145,241 A * | 9/1992 | Baylor | 305/156 |
| 5,601,505 A * | 2/1997 | Tada | 474/110 |
| 6,001,036 A * | 12/1999 | O'Brien et al. | 474/110 |
| 6,224,172 B1 | 5/2001 | Goodwin | |
| 6,305,762 B1 * | 10/2001 | Oertley | 305/145 |
| 6,916,264 B2 * | 7/2005 | Hashimoto et al. | 474/109 |
| 7,252,349 B2 | 8/2007 | Livesay et al. | |
| 7,527,572 B2 * | 5/2009 | Sato et al. | 474/109 |
| 7,866,420 B1 * | 1/2011 | Claas et al. | 180/9.1 |
| 2004/0266571 A1 * | 12/2004 | Izutsu et al. | 474/110 |

FOREIGN PATENT DOCUMENTS

| | | | |
|---|---|---|---|
| DE | 7739947 U1 | | 9/1979 |
| DE | 3034372 A1 | | 3/1982 |
| FR | 2419208 A | * | 11/1979 |

* cited by examiner

Fig. 2  F-F
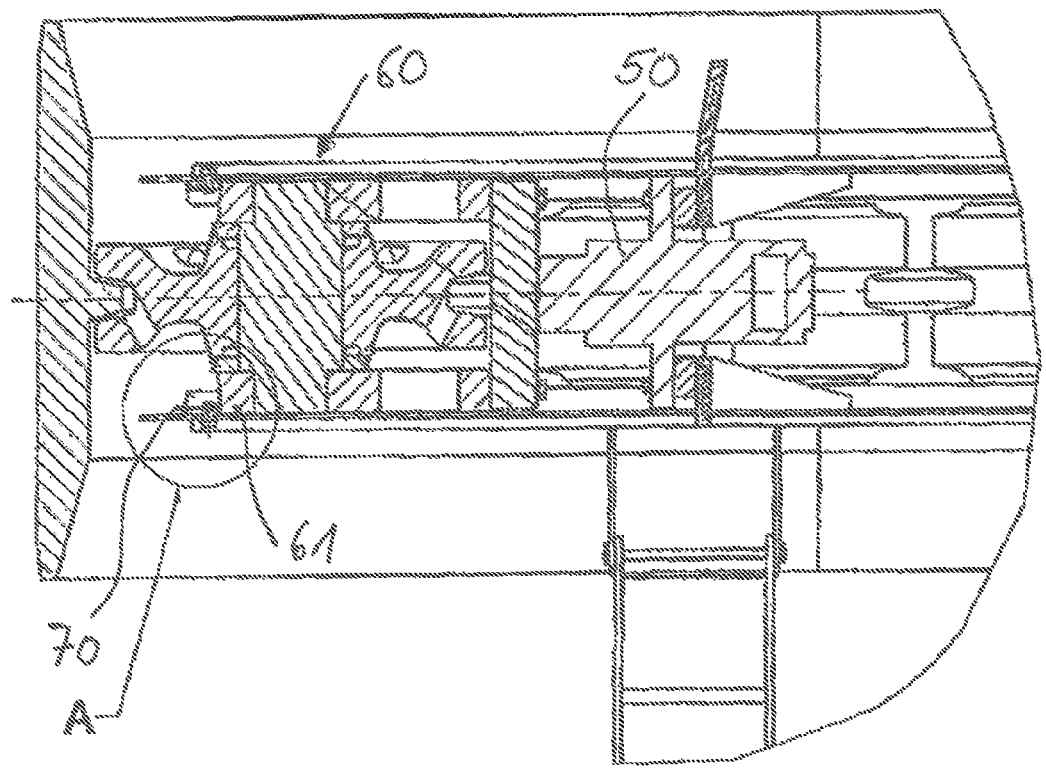
Fig. 3
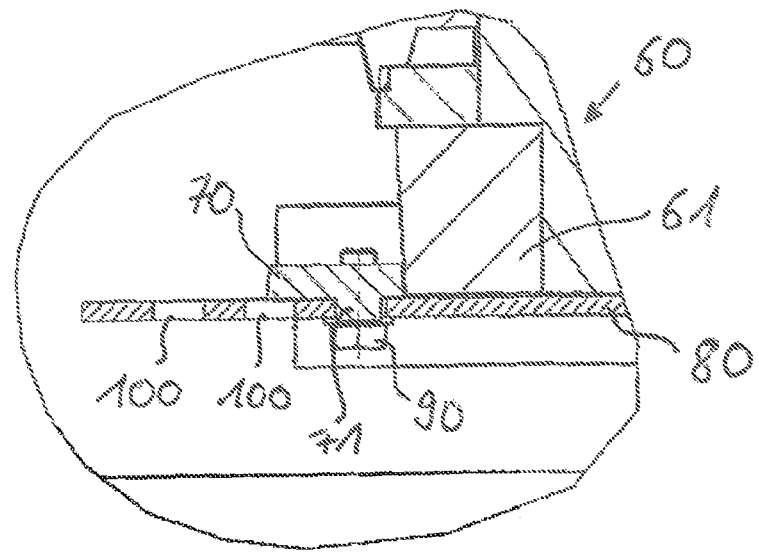

CHAIN DRIVE ASSEMBLY AND WORK MACHINE

CROSS REFERENCE TO RELATED APPLICATION

This application claims priority to German Patent Application No. 10 2010 031 834.5, entitled "Chain Drive Assembly and Work Machine", filed Jul. 22, 2010, which is hereby incorporated by reference in its entirety for all purposes.

TECHNICAL FIELD

The present disclosure relates to a chain drive assembly for a work machine, in particular for a crawler-mounted crane or a crawler excavator, having a drive crawler track, at least one displaceably supported sprocket wheel, in particular a guide wheel or idler wheel, and at least one tensioning device to tension the crawler track.

BACKGROUND AND SUMMARY

Chain drive assemblies for work machines substantially comprise a crawler track which has a plurality of mutually connected hinged components or connections. Furthermore, at least one drive wheel and/or one guide wheel as well as a limited number of idler wheels are provided, with the crawler track being guided by each of the sprocket wheels.

To ensure the correct guidance of the chain on the sprocket wheels, the tension of the chain must be maintained during operation. A corresponding tensioning device which brings the chain to the desired tension level serves this purpose. A hydraulic cylinder or a helical spring which urge the front guide wheel of the chain drive assembly onto the chain to produce the desired chain tension serves as the tensioning device, for example. The applied pressure in the hydraulic cylinder determines the tension applied to the chain.

As the operating time increases, wear phenomena occur as a rule at the individual chain components, in particular at the connection points of the individual chain links, which results in a slackening of the chain tension and furthermore in a sagging of the chain. The excessive sag of the chain causes irregular wear of the individual chain components and can furthermore trigger a derailing of the chain guided on the sprocket wheels. To counter this phenomenon, it is necessary that the tension applied to the chain is regulated by the tensioning device as required.

Care must, however, be taken in this respect that an overtensioning of the chain by the tensioning device is to be avoided. A chain which is set too tight can hugely restrict the durability of the chain in the long term since in this case the wear phenomena of the individual chain components which occur advance a lot faster.

Nevertheless, it can likewise be desirable that the chain tension is to be adapted to the respective working conditions of the work machine. It is thus desirable to tension the chain during working operation to a maximum tension level, whereas a chain tension reduced with respect to the maximum tension level is sufficient during transport operation and thus allows an optimization of the potential chain service life.

With known tensioning device such as hydraulic cylinders, the respective chain tension is determined by the pressure relationships in the hydraulic cylinder. In this respect it applies that the increase in the pressure level in the hydraulic cylinder has the consequence of an increase in the chain tension. This approach, however, requires expensive hydraulic components such as pressure limiting valves for pressure regulation.

It is therefore the object of the present invention to provide a simplified and improved design for a chain drive assembly. In particular an alternative approach for the implementation of a chain tensioning mechanism should be provided.

This object is achieved by a chain drive assembly for a work machine, having a drive crawler track, at least one displaceably supported sprocket wheel, and at least one tensioning device to tension the crawler track, wherein at least one abutment is provided which bounds the displacement of the displaceably supported sprocket.

In one particular example, a chain drive assembly for a work machine, in particular for a crawler-mounted crane or a crawler excavator, includes a drive crawler track, at least one displaceably supported sprocket wheel, in particular a guide wheel or idler wheel, and at least one tensioning device to tension the crawler track. The drive crawler track is guided over the sprocket wheel in a manner known per se. At least one sprocket wheel is displaceably supported, and indeed such that the displacement takes place in the direction of the chain on which the sprocket wheel lies, and the pressure of the sprocket wheel on the inner side of the chain is increased. The chain tension can be adjusted via the actuation of the tensioning device.

In accordance with the present disclosure, at least one abutment is provided which bounds the displacement of the displaceably supported sprocket wheel. The bounding of the displacement of the sprocket wheel takes place in the displacement direction increasing the chain tension. A displacement of the sprocket wheel in the opposite direction results in a reduction in the applied chain tension. An additional abutment can be provided which bounds the displacement of the displaceably supported sprocket wheel in the opposite direction.

Due to the abutment in accordance with the present disclosure, the tensioning device can act onto the displaceably supported sprocket wheel with a constant pressure. The maximum applied chain tension is bounded to a maximum value by the abutment. An overtensioning of the chain is prevented, which reduces the wear of the crawler track and optimizes its durability.

The abutment can be designed as adjustable. The adjustability of the abutment allows a variation of the applied chain tension. The displacement of the sprocket wheel generated by the tensioning device can consequently be limited to different maximum values.

The tensioning device can be designed as a known cylinder unit, in particular as a hydraulic cylinder unit. In the embodiment as a hydraulic cylinder unit, a constant pressure level can be applied at the hydraulic cylinder unit which presses the displaceably supported sprocket wheel towards the chain. The corresponding chain tension is not adjustable by pressure regulation, but by the abutment in accordance with the present disclosure. The pressure level of the hydraulic cylinder remains constant. Special hydraulic components such as a pressure limiting valve are no longer required. The hydraulic cylinder is acted on, for example, by a constant maximum pressure. The pressure of the sprocket wheel on the chain is only regulated via the abutment.

The displacement of the sprocket wheel for the configuration of the chain tension takes place in the direction of travel. Expediently, an outwardly disposed sprocket wheel, in particular the guide wheel, is displaceably supported. The displacement of the guide wheel takes place in the direction of travel away from the adjacent sprocket wheels so that the pressure on the inner side of the chain is increased. In this case, the displacement of the guide wheel or of the sprocket wheel in the direction of travel is bounded by the abutment in accordance with the present disclosure.

The fastening of at least one abutment takes place by a screw connection. The abutment can either be removed or attached in an offset manner by releasing the screw connection.

One or more boreholes are provided for receiving the screw connection in the region of the axial mount of the sprocket wheel. These bores are disposed in a distributed manner in the direction of travel with the same spacing or a varying spacing from one another so that the fixing of the abutment to one of the boreholes allows a defined maximum displacement of the sprocket wheel.

The present disclosure is furthermore directed to a work machine which has at least one chain drive assembly in accordance with one of the preceding features. The use of the chain drive assembly in accordance with the present disclosure at a crawler-mounted crane or a crawler excavator is particularly advantageous.

Further advantages and details of the present disclosure will be explained in more detail in the following with reference to the drawings.

BRIEF DESCRIPTION OF THE FIGURES

FIG. 2 shows a sectional representation of the chain drive assembly in accordance with the present disclosure of FIG. 1 along the section line F-F.

FIG. 3 shows a detail view of the marked region A of FIG. 2. The figures are drawn approximately to scale, although modifications to the geometry may be made.

DETAILED DESCRIPTION

Figure 1:
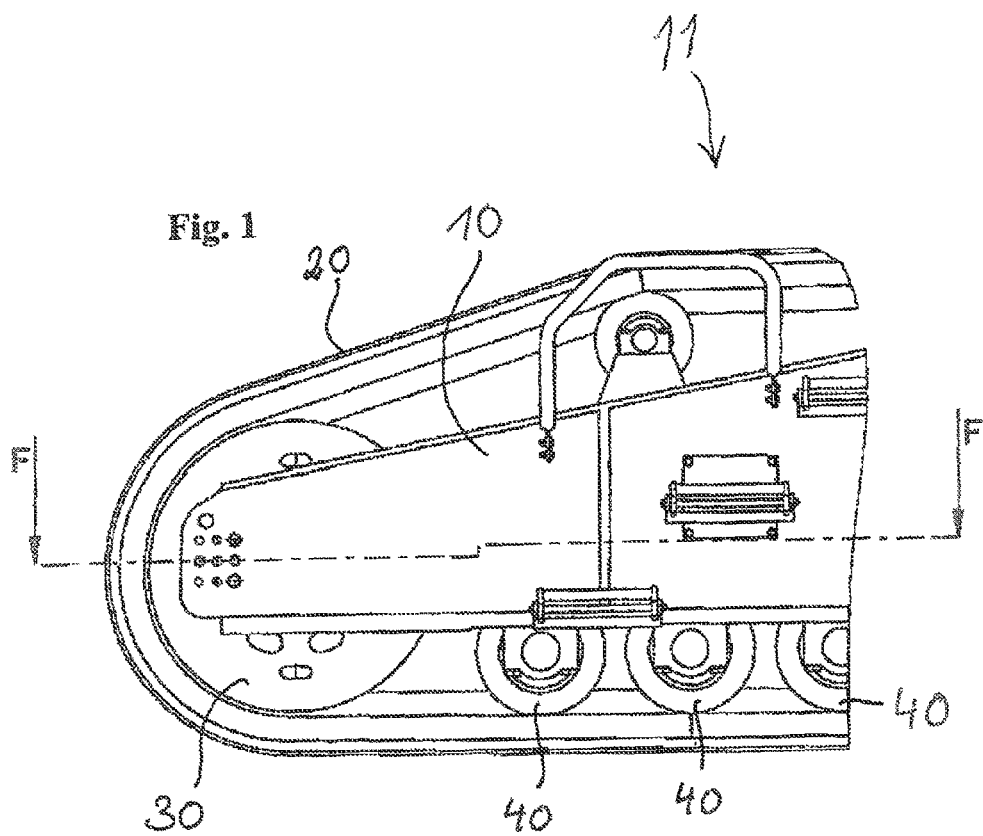
FIG. 1 shows a partial region of the chain drive assembly in accordance with the present disclosure in a side view.

In the following, a better understanding of the operation of the chain drive assembly in accordance with the present disclosure will be given with reference to FIG. 1 that shows a portion of a work machine 11. As can be seen from the representation of FIG. 1, the chain drive assembly substantially comprises the frame arrangement 10 which has a plurality of axial mounts for the individual sprocket wheels. The representation shows the region of the chain drive assembly at the front in the direction of travel. The guide wheel 30 is arranged in the front region at the frame arrangement 10. The drive wheel, not shown, of the chain drive assembly is located at the opposite end of the frame arrangement 10. A defined number of running wheels 40 is located between the guide wheel 30 and the drive wheel, not shown. The chain 20 of the chain drive assembly is carried by the individual chain wheels and driven by the drive wheel. In one example, the chain 20 forms an example drive crawler track. Further, wheel 30 may, in one alternative, be an idler wheel.

The chain structure includes individual chain links which are mutually pivotally connected via articulated arrangements. The chain is tensioned by the pressure of the guide wheel 30 on the inner side of the chain as well as the other sprocket wheels.

Wear phenomena at the individual chain links can result in a drop in the chain tension, whereby the chain 20 tends to sag. To counter this problem, the guide wheel 30 is supported at the frame arrangement 10 displaceably thereto. In the representation of FIG. 1, the guide wheel 30 can be displaced outwardly along a horizontally disposed axis F-F, that is away from the running wheels 40, so that the contact pressure of the guide wheel 30 on the inner side of the chain 20 increases. The chain tension hereby increases.

A hydraulic cylinder fastened to the frame arrangement 10 serves to displace the guide wheel 30. The piston rod of the hydraulic cylinder presses the guide wheel 30 toward the inner side of the chain 20 due to the applied hydraulic pressure.

FIG. 2 shows a sectional representation along the longitudinal axis F-F of FIG. 1. The hydraulic cylinder 50 can be recognized in the sectional representation whose piston effects a displacement of the axial mount 60 of the guide wheel 30 to the left in the plane of the drawing.

Since a complex hydraulic control required for the adjustability of the hydraulic pressure at the hydraulic cylinder 50 is to be dispensed with, an abutment 70 is provided in accordance with the present disclosure which bounds the displacement of the axial mount 60. The axial mount 60 is displaced to the left in the example of FIG. 2 until the abutment member with an edge 61 abuts the abutment 70 and blocks the movement of the axial mount 60 or of the guide wheel 30. The pressure in the hydraulic cylinder 50 can therefore be kept constant. The extent of the displacement of the guide wheel 30 is determined solely by the position of abutment 70.

The attachment of the chain abutment 70 to the frame arrangement 10 is variably designed, whereby the maximum displacement of the guide wheel 30 and the resulting chain tension can be set. Furthermore, an overtensioning of the chain is prevented by the presented mechanism. This in particular results in the reduction of the resulting wear of the crawler track during operation and increases the durability of the chain 20.

FIG. 3 shows a detail representation of the abutment 70 in accordance with the present disclosure in the marked region A of FIG. 2. A plurality of boreholes 100 is located at the plate 80 of the frame arrangement 10. The abutment 70 substantially comprises a plate having a projecting region 71 which can be inserted into the corresponding borehole 100. The fixing of the abutment 70 at the plate 80 takes place via the screw connection 90. The axial mount 60, which is displaceably guided along the plate 80, is blocked in its movement by the arranged abutment 70. To design the maximum displacement as variably adjustable, a plurality of bores 100 is arranged on the plate 80. The abutment 70 can be inserted selectively in one of the boreholes 100 via the screw connection 90. The adjustment of the abutment 70 can accordingly be carried out particularly simply and fast. Only the screw connection 90 has to be released and retightened at the target borehole 100.

The chain drive may be mounted in a vehicle, such as a work machine, including a crawler-mounted crane or a crawler excavator.

The invention claimed is:

1. A chain drive assembly for a work machine, comprising:
   a drive crawler track;
   at least one displaceably supported sprocket wheel; and
   at least one tensioning device to tension the crawler track;
   wherein at least one abutment comprising a plate having a projecting region is provided which bounds the displacement of the displaceably supported sprocket wheel, the at least one abutment fixed to a frame of the work machine by a screw connection, the frame of the work machine comprising a plurality of boreholes, and
   wherein the displacement of the displaceably supported sprocket wheel is variably adjustable via selective insertion of the projecting region of the at least one abutment into one of the plurality of boreholes.

2. The chain drive assembly in accordance with claim 1, wherein the abutment is adjustable.

3. The chain drive assembly in accordance with claim 2, wherein the tensioning device includes at least one hydraulic cylinder unit.

4. The chain drive assembly in accordance with claim 3, wherein at least one abutment bounds displacement of the sprocket wheel in a direction of travel.

5. The chain drive assembly in accordance with claim 4, wherein the at least one abutment is fixed by the screw connection to a plate of the frame of the work machine at a front of the chain drive assembly in the direction of travel, the at least one abutment bounding an axial mount of the sprocket wheel in the direction of travel.

6. The chain drive assembly in accordance with claim 5, wherein the plurality of boreholes are arranged in the plate of the frame and are provided at the front of the chain drive assembly in the direction of travel for receiving the at least one abutment.

7. The chain drive assembly in accordance with claim 5, wherein the work machine comprises a crawler-mounted crane or a crawler excavator having the chain drive assembly.

8. The chain drive assembly in accordance with claim 1, wherein the sprocket wheel is a guide wheel or an idler wheel.

9. The chain drive assembly in accordance with claim 1, wherein the plurality of boreholes comprises a first borehole and a second borehole, and wherein the displacement of the sprocket wheel is adjustable between a first maximum displacement where the projecting region of the at least one abutment is inserted in the first borehole and a second maximum displacement where the projecting region of the at least one abutment is inserted in the second borehole.

10. A chain drive assembly for a work machine, comprising:
a drive crawler track engaging a plurality of wheels, including a front sprocket wheel, where the front sprocket wheel is displaceably mounted to a frame of the work machine comprising a plurality of boreholes;
at least one tensioning device to tension the crawler track by displacing the front sprocket wheel outwardly in a direction of travel of the work machine; and
at least one abutment mounted to the frame of the work machine by a screw connection at a front of the chain drive assembly in the direction of travel, wherein the at least one abutment bounds the displacement of the sprocket wheel;
wherein the displacement of the sprocket wheel is variably adjustable via selective insertion of a projecting region of the at least one abutment into one of the plurality of boreholes.

11. The chain drive assembly in accordance with claim 10, wherein the tensioning device includes at least one hydraulic cylinder unit.

12. The chain drive assembly in accordance with claim 11, wherein the at least one abutment is fixed by the screw connection at the front of the chain drive assembly to a plate of the frame, the at least one abutment bounding an axial mount of the sprocket wheel in the direction of travel.

13. The chain drive assembly in accordance with claim 12, wherein the plurality of boreholes are arranged in the plate of the frame for receiving the at least one abutment, the plurality of boreholes arranged at the front of the chain drive assembly.

14. The chain drive assembly in accordance with claim 13, wherein the work machine comprises a crawler-mounted crane or a crawler excavator having the chain drive assembly.

15. The chain drive assembly in accordance with claim 10, wherein the plurality of boreholes comprises a first borehole and a second borehole, and wherein the displacement of the sprocket wheel is adjustable between a first maximum displacement where the projecting region of the at least one abutment is inserted in the first borehole and a second maximum displacement where the projecting region of the at least one abutment is inserted in the second borehole.

\* \* \* \* \*